(12) United States Patent
Achiwa (10) Patent No.: US 8,928,939 B2
(45) Date of Patent: Jan. 6, 2015

(54) IMAGE PROCESSING APPARATUS OBTAINING PATCH DATA CORRESPONDING TO OBTAINED TIME BETWEEN PRINT PAGES

(71) Applicant: Canon Kabushiki Kaisha, Tokyo (JP)

(72) Inventor: Ken Achiwa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 62 days.

(21) Appl. No.: 13/707,857

(22) Filed: Dec. 7, 2012

(65) Prior Publication Data

US 2013/0155426 A1     Jun. 20, 2013

(30) Foreign Application Priority Data

Dec. 15, 2011 (JP) .................................. 2011-274393

(51) Int. Cl.
*G06K 1/00* (2006.01)
*G06K 15/02* (2006.01)
*G06K 15/12* (2006.01)
*G03G 15/01* (2006.01)
*G03G 15/00* (2006.01)
*G06K 9/40* (2006.01)

(52) U.S. Cl.
CPC .......... *G06K 15/1867* (2013.01); *G06K 15/027* (2013.01); *G06K 15/12* (2013.01); *G03G 15/0189* (2013.01); *G03G 15/5058* (2013.01); *G03G 2215/0129* (2013.01); *G03G 2215/0164* (2013.01)

USPC ............ 358/1.9; 358/3.26; 399/49; 382/274; 347/188

(58) Field of Classification Search
None
See application file for complete search history.

(56) References Cited

U.S. PATENT DOCUMENTS

| 6,049,394 | A  | * | 4/2000  | Fukushima |
| 6,697,167 | B1 | * | 2/2004  | Takahashi ...................... 358/1.9 |
| 6,977,734 | B2 | * | 12/2005 | Shima .......................... 358/1.12 |
| 7,333,740 | B2 | * | 2/2008  | Sakamoto et al. .............. 399/49 |
| 8,078,070 | B2 | * | 12/2011 | Kubo et al. ..................... 399/49 |

FOREIGN PATENT DOCUMENTS

JP    2010-39477    2/2010

* cited by examiner

*Primary Examiner* — Steven Kau
(74) *Attorney, Agent, or Firm* — Fitzpatrick, Cella, Harper & Scinto (57) ABSTRACT

A image processing apparatus of the present invention comprises an image generation unit configured to generate image data of one page, a printing unit configured to mount color material on an intermediate transfer member to perform printing, and an obtaining unit configured to obtain a time (a time between print pages) showing a time interval between printing one page and printing next one page by the printing unit, and the printing unit outputs patches for adjusting density to be reproduced in the printing, to the intermediate transfer member in the time between print pages.

7 Claims, 11 Drawing Sheets

| INTER-PAPER TIME INTERVAL | INTER-PAPER TIME INTERVAL EXTENSION | NUMBER OF PATCHES | | |
|---|---|---|---|---|
| | | M | N | TOTAL |
| 0.4 SEC | 0.0 SEC | 1 | 0 | 1PATCH |
| 0.4 SEC | 0.2 SEC | 1 | 1 | 2PATCHES |
| 0.4 SEC | 0.4 SEC | 1 | 2 | 3PATCHES |
| 0.4 SEC | 0.6 SEC | 1 | 3 | 4PATCHES |
| 0.4 SEC | 0.8 SEC | 1 | 4 | 5PATCHES |
| 0.4 SEC | 1.0 SEC | 1 | 5 | 6PATCHES |
| 0.4 SEC | 1.2 SEC | 1 | 6 | 7PATCHES |
| 0.4 SEC | 1.4 SEC | 1 | 7 | 8PATCHES |
| 0.4 SEC | 1.6 SEC | 1 | 8 | 9PATCHES |
| 0.4 SEC | 1.8 SEC | 1 | 9 | 10PATCHES |

FIG.11

IMAGE PROCESSING APPARATUS OBTAINING PATCH DATA CORRESPONDING TO OBTAINED TIME BETWEEN PRINT PAGES

BACKGROUND OF THE INVENTION

1. Field of the Invention

The present invention relates to an image processing apparatus provided with a density correction unit.

2. Description of the Related Art

Among conventional image processing apparatuses, there is an apparatus which is provided with a density correction mechanism for the purpose of keeping a stable image density when forming an image onto a medium. Specifically, there is an apparatus which realizes density correction by forming a patch for density measurement (hereinafter, patch) on an intermediate transfer body, detecting a toner accumulation amount of the patch with an optical sensor, and reflecting an obtained density to a value of a density correction table. When such density correction is performed, generally there exists a trade-off in a relationship between correction accuracy and processing speed. That is, when the correction is performed after a necessary and sufficient number of patches are obtained for performing a higher-accuracy density correction, the number of patches is increased and thereby a longer time is required for processing necessary for the correction. Accordingly, sometimes there is generated a downtime during which printing cannot be performed.

Meanwhile, when the correction is performed by using an available number of patches, utilizing a warm-up time for activation or a time between print pages without generating the downtime, the accuracy of the density correction sometimes becomes low because of an insufficient number of patches to be used for the correction.

For this problem, Japanese Patent Laid-Open No. 2010-39477 describes that a density range of the patch to be formed is changed according to environmental temperature change so as to cause a developing characteristic to be corrected efficiently in a vicinity of a target density by the use of an available number of patches without the downtime generation.

SUMMARY OF THE INVENTION

As described above, the density correction of the conventional image processing apparatus forms a predetermined number of patches utilizing the warm-up time or the time between print pages. Accordingly, for example in a case where the time between print pages is extended because of interpreter processing (hereinafter, PLD processing) or rendering processing (hereinafter, RIP processing) for PDL data, the extended time between print pages is not utilized effectively for the density correction.

Accordingly, the present invention aims to improve the accuracy of the density correction while suppressing the generation of the downtime caused by the density correction.

For solving the above problem, an image processing apparatus according to the present invention is provided with an image generation unit configured to generate image data of one page, a printing unit configured to transfer color material onto an intermediate transfer member and perform printing, an obtaining unit configured to obtain a time (a time between print pages) which shows a time interval between printing image data of one page and printing image data of next one page by the printing unit, in which the printing unit outputs a larger number of patches to the intermediate transfer member as the time between print pages is longer, for adjusting density to be reproduced in the printing by the printing unit.

According to the present invention, it is possible to improve the accuracy of the density correction while suppressing the generation of the downtime caused by the density correction.

Further features of the present invention will become apparent from the following description of exemplary embodiments (with reference to the attached drawings).

DESCRIPTION OF THE EMBODIMENTS

Hereinafter, embodiments for carrying out the present invention will be explained with reference to the drawings.

(First Embodiment)

Figure 1:
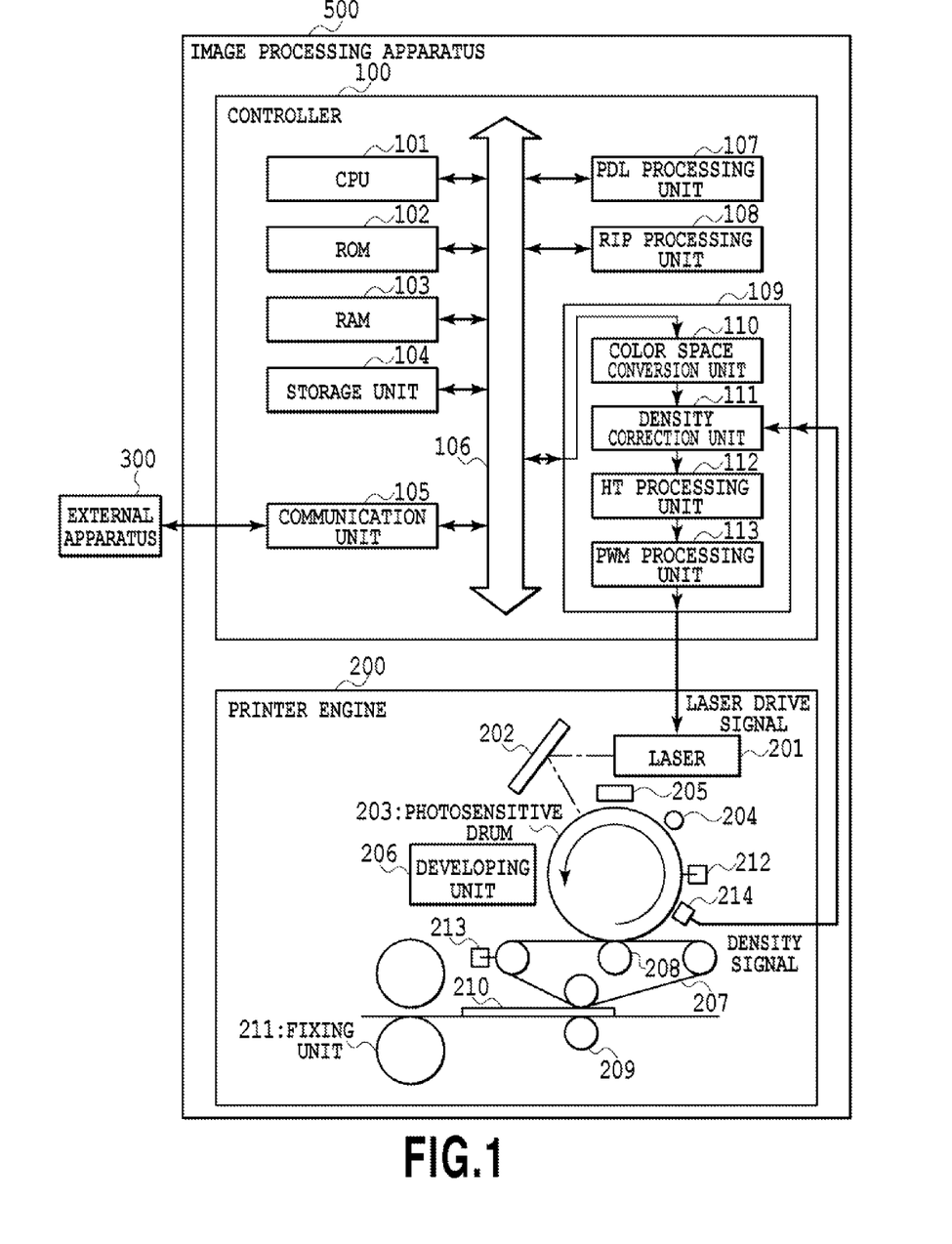
FIG. 1 is a block diagram showing a configuration of an image processing apparatus.

FIG. 1 is a block diagram showing a configuration example of an image processing apparatus 500 in a first embodiment of the present invention. As shown in FIG. 1, the image processing apparatus 500 is configured with a controller 100 and a printer engine 200.

An external apparatus 300 includes an interface with a computer, a server, and a network such as a LAN and a public line (WAN), and transmits image information such as PDL data and receives device information to and from the image processing apparatus 500.

The controller 100 is configured with a CPU 101, a ROM 102, a RAM 103, a storage unit 104, a communication unit 105, a system bus 106, a PDL processing unit 107, a RIP processing unit 108, and a print image processing unit 109.

The controller 100 executes the PDL processing, the RIP processing, and print image processing to generate image data for the PDL data which is received from the external apparatus 300 via the communication unit 105, and transmits the generated image data to the printer engine 200. That is, the controller 100 functions as an image generation unit configured to generate image data of one page, which corresponds to a print medium, from the PDL data.

The CPU 101 is a control unit configured to transfer the image data among individual units of the controller 100 and execute the image processing for the image data. Note that, the CPU 101 executes various kinds of control by sequentially executing programs stored in the ROM 102 or the RAM 103.

The ROM 102 is a storage unit configured to retain the programs to be executed by the CPU 101. The RAM 103 is a storage unit configured to temporarily store various kinds of data for the processing of the CPU 101. The storage unit 104 is a storage unit which is configured with a large capacity storage apparatus such as a hard disk drive and a flush memory and stores an image processing parameter such as a parameter for a density correction patch other than the device information and the image data.

The communication unit 105 performs data transmission and reception with the external apparatus 300. Further, the communication unit 105 includes an interface with a computer, a server, and a network such as a LAN and a public line (WAN) and can perform data transmission and reception with various apparatuses on the network.

The system bus 106 is configured with a high speed bus such as a PCI bus and an AXI bus and works as a path for transferring the image data among the individual units of the controller 100.

The PDL processing unit 107 is an interpreter unit configured to interpret a draw command described with a page description language for the PDL data and generate a display list.

The RIP processing unit 108 is a rendering unit configured to generate the image data from the display list generated by the PDL processing unit 107.

The print image processing unit 109 performs color space conversion, density correction, halftone processing, and pulse width modulation processing for the image data which is generated after the RIP processing, and transmits the image data after the processing to the printer engine 200.

A color space conversion unit 110 is a processing unit configured to convert the image data of the RGB color space into image data of the CMYK color space which is suitable for toner color of recording material.

A density correction unit 111 is a processing unit configured to perform density correction for the image data by gamma conversion using a lookup table (LUT).

An HT processing unit 112 is a processing unit configured to perform the halftone processing by screen processing or error diffusion processing. Here, in the case of the screen processing, the HT processing unit 112 binarizes the input image data using plural predetermined dither matrices. Further, in the case of the error diffusion processing, the HT processing unit 112 binarizes the input image data by comparing the image data with a predetermined threshold value and diffuses a difference between the above image data and the threshold value to peripheral pixels which are subsequently to be binarized.

A PWM processing unit 113 is a processing unit configured to perform the Pulse Width Modulation (PWM). The PWM processing unit 113 performs comparison between an image signal which expresses the image data provided with the halftone processing and a saw-tooth wave signal having a predetermined period, and outputs a laser drive signal provided with the pulse width modulation. This laser drive signal is output to the printer engine 200.

The printer engine 200 is configured with a laser 201, a photosensitive drum 203, a developing unit 206, a transfer belt 207, a fixing unit 211, an optical sensor 214, and the like. The printer engine 200 is a printing unit configured to mount color material on an intermediate transfer member such as the photosensitive drum 203 and to perform printing onto a medium.

The laser 201 emits a laser beam on receiving the laser drive signal. The emitted laser beam illuminates the photosensitive drum 203 rotating in the direction of the arrow via a polygon mirror (not shown in the drawing), an f-θ lens (not shown in the drawing), and a reflection mirror 202.

Thereby, an electrostatic latent image is formed on the photosensitive drum 203. The photosensitive drum 203 is electrostatically charged uniformly by a charger 205 after being neutralized uniformly by an exposure unit 204. After that, by the illumination of the above laser beam, the electrostatic latent image is formed on the photosensitive drum 203 according to the print image. Then, this electrostatic latent image is developed by toner supplied from the developing unit 206 as a visible image (toner image). The developed toner image is transferred to the transfer belt 207 having a belt shape, which is expanded across plural rollers and driven in an endless manner, by an action of a primary transfer unit 208.

The toner image transferred to the transfer belt 207 is transferred to a recording medium 210 by a secondary transfer unit 209.

The toner image is fixed onto the recording medium 210 when the recording medium 210 is carried through the fixing unit 211. Then, the recording medium 210 is ejected outside the image processing apparatus 500. Further, after that, the remaining toner left on the photosensitive drum 203 is scraped by a cleaner 212 to be retrieved. Moreover, after the recording medium 210 has been separated, the remaining toner left on the transfer belt 207 is scraped by a cleaner 213 such as a blade. Further, at a position between the developing unit 206 and a facing part of the transfer belt 207, the optical sensor 214 is provided for measuring a density measurement patch. The optical sensor 214 detects density of the density measurement patch developed on the photosensitive drum 203 and transmits the detected density to the density correction unit 111 as a density signal. On receiving this signal, the density correction unit 111 corrects a value of the lookup table (LUT) which performs the gamma conversion. Details of this density correction will be described below.

Note that, while FIG. 1 illustrates the PDL processing unit 107 and the RIP processing unit 108 as processing units independent from the CPU 101, the CPU 101 may perform the processing to be performed by the PDL processing unit 107 and the RIP processing unit 108.

Further, FIG. 1 illustrates only a single image formation station (including the photosensitive drum 203, the charger 205, the developing unit 206, and the like), for simple explanation. However, in a case where a color image is formed, the image formation stations corresponding to individual colors of cyan, magenta, yellow, and black, for example, are arranged over the transfer belt sequentially along the travelling direction thereof. Alternatively, the developing units 206 for individual colors are arranged along the periphery of the single photosensitive drum 203. Alternatively, the developing units 206 for individual colors of cyan, magenta, yellow, and black are arranged on a rotatable case. That is, the desired developing unit 206 is caused to face the photosensitive drum 203 so as to develop a desired color.

In addition, while FIG. 1 illustrates an intermediate transfer member to which the optical sensor is disposed, as the photosensitive drum, there may be used another intermediate transfer member, such as the transfer belt, which can achieve the purpose of the present embodiment.

Next, with reference to FIG. 4 to FIGS. 6A and 6B, there will be explained an outline of density correction in the first embodiment of the present invention.

Figure 4:
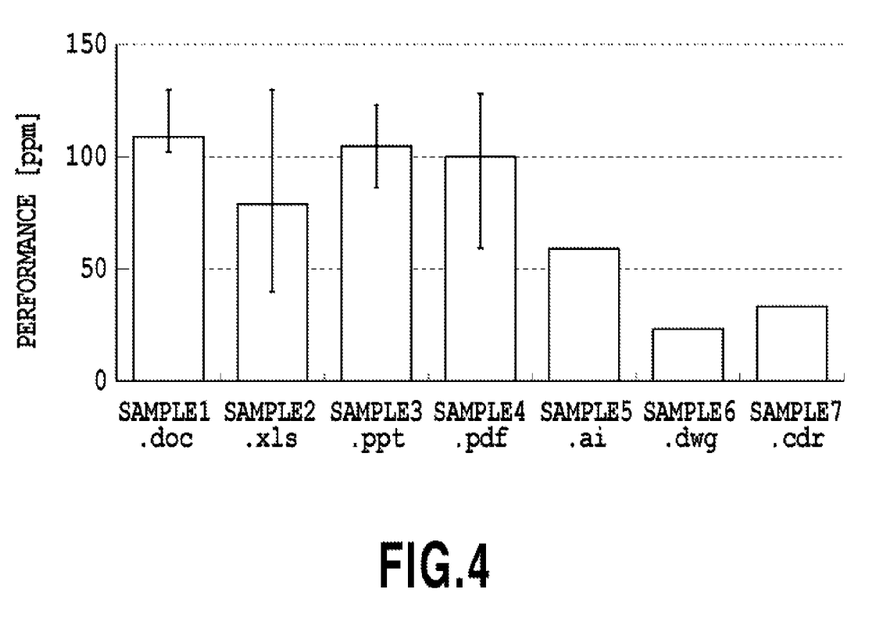
FIG. 4 is a graph showing a relationship of a RIP processing speed to a kind of PDL data.

FIG. 4 is a graph showing a relationship of a processing speed in the RIP processing unit 108 to a sample of the PDL data transmitted from the external apparatus 300 to the image processing apparatus 500. Here, differences of the extensions among the respective samples, samples 1 to 7, indicate that data formats are generated by respective different applications. Note that, for example, samples 1 to 4 are assumed to be PDL data of plural pages, and samples 5 to 7 are assumed to be PDL data of a single page.

A bar graph shown in FIG. 4 indicates an average value for all the pages configuring each of the samples, and, in particular, a line segment expressed on the bar graph for each of samples 1 to 4 shows a swing width from the minimum value to the maximum value for an individual page configuring each of the samples. For the vertical axis of FIG. 4, a printable number of pages per a minute (PPM: Page Per Minute) is used as a unit expressing the processing speed.

As shown in FIG. 4, the processing speed of the RIP processing unit 108 has a different characteristic depending on a drawing object configuring the PDL data to be processed. That is, there is a page having a high processing speed because of a small number of drawing objects and there is also a page having a low processing speed because of a large number of drawing objects. Further, exactly the same as the RIP processing unit 108, the processing speed of the PDL processing unit 107 also has a different characteristic depending on the drawing object configuring the PDL data to be processed.

In this manner, the processing speeds of the PDL processing unit 107 and the RIP processing unit 108 change depending on the PDL data to be processed, and therefore a processing time for one page is changeable. Meanwhile, the printer engine 200 needs almost the same time for printing one page because each of the individual units configuring the printer engine 200 operates always at a fixed speed. Accordingly, in a case where either one or both of the processing speeds in the PDL processing unit 107 and the RIP processing unit 108 are lower than the engine speed, the printer engine 200 cannot execute the print processing at the engine speed for the page.

From the above reason, because of the existence of a page causing the processing speed of the PDL processing unit 107 or the RIP processing unit 108 to be a bottleneck, a downtime is generated extending the time between print pages. Note that, the above described time between print pages is a time which is required for the image transfer and the paper carriage by the printer engine 200 and corresponds to a physical interval from the back end of a recording medium 210 of the previous page to the front end of a recording medium 210 of the following page, in the print processing for the successive pages.

Figure 5A:
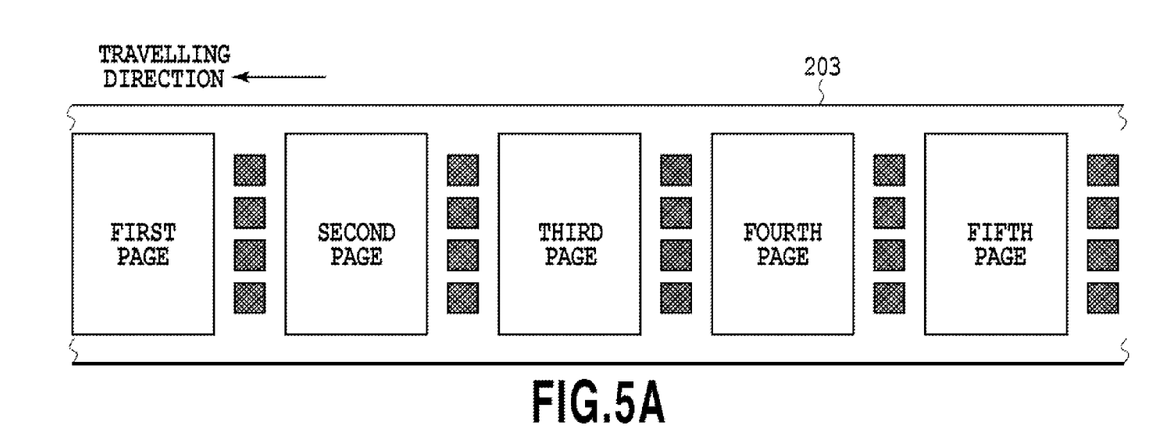
FIGS. 5A and 5B are diagrams for explaining density correction patches formed in a time between print pages.
Figure 5B:
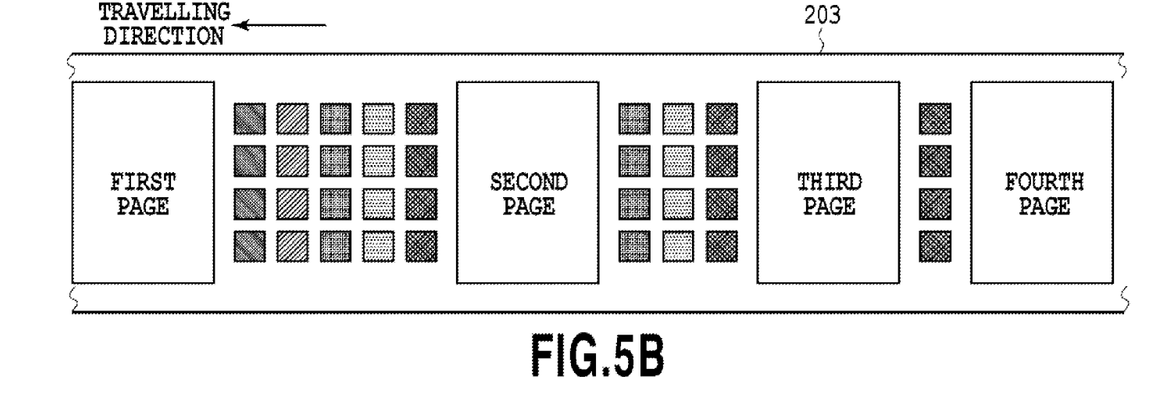

FIGS. 5A and 5B are diagrams for explaining a state of a patch which is formed on the intermediate transfer member in the time between print pages for adjusting density to be reproduced in printing.

FIG. 5A is a diagram showing an example of a case without extension of the time between print pages which is caused by the processing speed of the interpreter processing or the rendering processing for the PDL data as explained with reference to FIG. 4. As shown in FIG. 5A, on the photosensitive drum 203 which is an intermediate transfer member, one line of the color patches indicating respective halftone intensities of cyan, magenta, yellow, and black is formed between individual pages.

Note that, while FIG. 5A illustrates one patch for each color (total four patches) for simple explanation, the number of the patches may be a number which can be formed in a usual fixed time between print pages, and this example does not limit the number of the patches which can be formed in the usual time between print pages interval.

It is to be noted that each of the patches is formed at a position where the patch can be detected by the optical sensor 214 and in a range (rectangular region or the like) where the patch can be detected by the optical sensor 214.

FIG. 5B is a diagram showing a case with extension of the time between print pages which is caused by the processing speed of the interpreter processing or the rendering processing for the PDL data as explained with reference to FIG. 4.

As shown in FIG. 5A, on the photosensitive drum 203, as in FIG. 5A, color patches indicating respective halftone intensities of cyan, magenta, yellow, and black are formed between individual pages.

Here, in particular, for the second page and the third page, the processing speed of the interpreter processing or the rendering processing for the PDL data is lower than the engine speed, and thereby the time between print pages is extended. Therefore, patches are formed more than the patches formed in the usual time between print pages. In this manner, for the patches formed in the present embodiment, patches are formed more than usual when the time between print pages is extended. Accordingly, the extended time between print pages can be utilized for the purpose of the density correction.

Specifically, in a case where the processing speed of the interpreter processing or the rendering processing for the PDL data of the second page is lower than the engine speed, more than usual, for example five patches (total 20 patches), are formed for each color as the density correction patches. Further, similarly, in a case where the processing speed of the interpreter processing or the rendering processing for the PDL data of the third page is lower than the engine speed, three patches (total 12 patches), for example, are formed more than usual for each color as the density correction patches.

In this manner, the present embodiment changes the number of the patches to be formed dynamically according to the extended time between print pages. That is, as the time between print pages becomes longer, the number of the patches to be formed is increased.

Figure 6A:
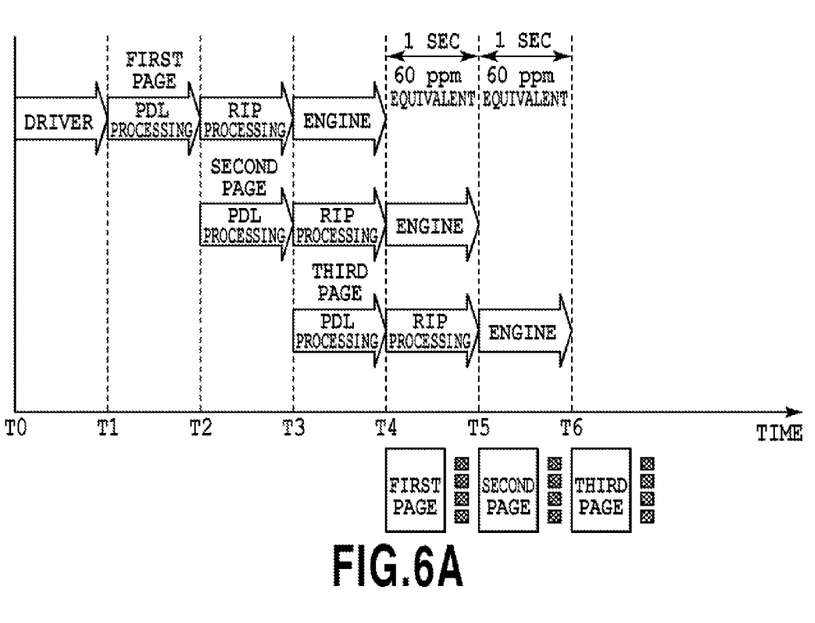
FIGS. 6A and 6B are time charts showing relationships of processing time among individual units in a case where pages are sequentially processed.
Figure 6B:
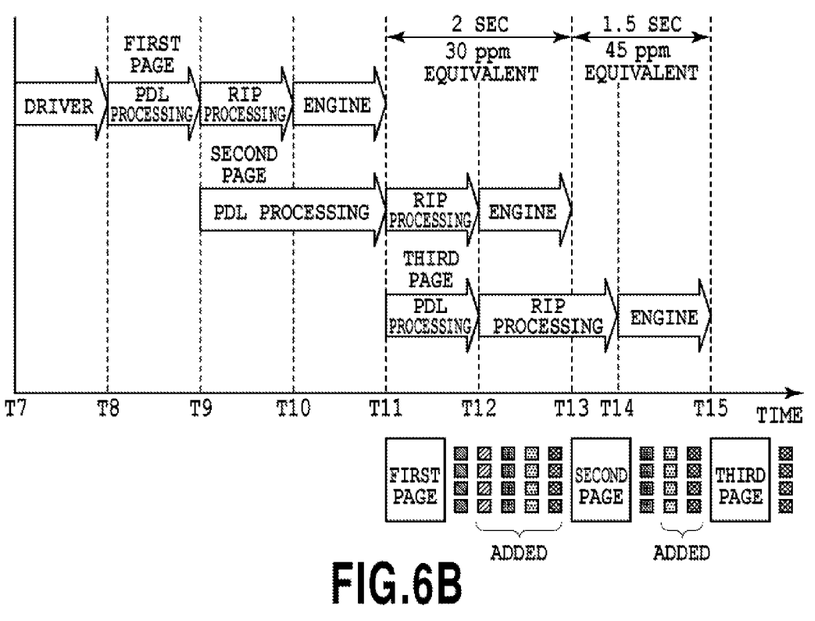

FIGS. 6A and 6B are time charts each showing a relationship of processing time among the individual units in a case where pages are processed sequentially. FIGS. 6A and 6B correspond to FIGS. 5A and 5B, respectively.

Without the extension of the time between print pages, as shown in FIG. 6A, PDL data, which is generated by an application on the external apparatus 300 between time T0 and time T1, provides a print request to the image processing apparatus 500 via the printer driver on the external apparatus 300.

Next, between the time T1 and time T2, the PDL processing unit 107 performs the interpreter processing for the first page of the PDL data received by the image processing apparatus 500 via the communication unit 105, and generates a display list.

Subsequently, between the time T2 and time T3, while the PDL processing unit 107 performs the interpreter processing for the second page of the PDL data and generates a display list, the RIP processing unit 108 performs the rendering processing for the first page and generates image data.

Next, between the time T3 and time T4, while the first page image data is submitted to engine output, the RIP processing unit 108 performs the rendering processing for the second page and the PDL processing unit performs the interpreter processing for the third page.

In this manner, each processing step of the PDL processing, the RIP processing, and the engine output performs pipeline processing for each of the pages. Accordingly, when each of the processing time for the PDL processing and the RIP processing is shorter than the processing time of the engine, the print output can be performed without extension of the time between print pages. Specifically, when the engine speed is 60 ppm, for example, the time between the time T3 and the time T4 becomes 1 second.

Next, first, in a case where the time between print pages is extended, as shown in FIG. 6B, between time T7 and time T8, a print request for the PL data is sent to the image processing apparatus 500 via the external apparatus 300.

Subsequently, between the time T8 and time T9, the PDL processing unit 107 performs the interpreter processing for the first page of the PDL data received by the image processing apparatus 500 via the communication unit 105, and generates a display list.

Next, between the time T9 and time T10, while the PDL processing unit 107 performs the interpreter processing for the second page of the PDL data and generates a display list, the RIP processing unit 108 performs the rendering processing for the first page and generates image data. Here, in a case where the PDL processing speed for the PDL data of the second page is lower than the fixed engine speed, the processing of the PDL processing unit 107 is not completed by the time T10. For example, as shown in FIG. 6B, sometimes the PDL processing continues until time T11. Then, between the time T10 and the time T11, since the PDL processing unit 107 performs the interpreter processing of the second page continuously from the time T9 while the image data of the first page is submitted to the engine output, the PDL processing unit 107 cannot perform the interpreter processing of the third page.

Subsequently, between the time T11 and time T12, while the RIP processing unit 108 performs the rendering processing of the second page, the PDL processing unit 107 performs the interpreter processing of the third page. Here, in a case where the time between print pages is not extended as shown in FIG. 6A, an interrupt notification indicating the end of rendering processing for the second page is sent by the time T4 from the RIP processing unit 108 to the CPU 101.

On the other hand, in a case where the time between print pages is extended as shown in FIG. 6B, as a result of the delay of the interpreter processing of the second page, the interrupt notification indicating the end of the rendering processing, which should have been sent by the time T11, is sent belatedly until time T12. The present embodiment focuses on this point, and, as shown in S705 of FIG. 7 to be described below, while polling the above interrupt notification indicating the end of the rendering processing, the present embodiment generates and obtains the patches and performs the density correction by utilizing the time between the time T11 and the time T12.

Next, between the time T12 and time T13, while the image data of the second page is submitted to the engine output, the RIP processing unit 108 performs the rendering processing of the third page and generates image data. However, in a case where the RIP processing speed for the PDL data of the third page is lower than the engine speed as explained with reference to FIG. 5B, the processing of the RIP processing unit 108 is not completed by the time T13 and continues until time T14 as shown in FIG. 6B. Here, in a case where the time between print pages is not extended as shown in FIG. 6A, an interrupt notification indicating the end of the rendering processing for the third page is sent by the time T5 from the RIP processing unit 108 to the CPU 101. On the other hand, in a case where the time between print pages is extended as shown in FIG. 6B, as a result of the delay of the rendering processing for the third page, the interrupt notification, which should have been sent by the time T13, is sent belatedly until time T14.

The present embodiment focuses on this point, and, as shown in S705 of FIG. 7 to be described below, while polling the above interrupt notification indicating the end of the rendering processing, the present embodiment generates the patches and performs the density correction processing by utilizing this time between the time T13 and the time T14. Then, the image data of the third page is output to the engine between the time T14 and time T15.

In this manner, each processing step of the PDL processing, the RIP processing, and the engine output performs the pipeline processing for each of the pages, and therefore, in a case where the processing time of the PDL processing or the RIP processing is longer than a processing time of the engine, the time between print pages is extended and then the print output is performed.

For example, when the time from the engine output of the first page to the engine output of the second page (from the time T11 to the time T13) is 2 seconds, the print speed becomes equivalent to 30 ppm which is lower than the engine speed of 60 ppm. Further, the time from the engine output of the second page to the engine output of the third page (from the time T13 to the time T15) is 1.5 second, for example, the print speed becomes equivalent to 45 ppm which is lower than the engine speed of 60 ppm.

Next, with reference to FIGS. 7 to 9, there will be explained a flowchart of the density correction in the first embodiment of the present invention. Note that, each step shown in each of the flowcharts is assumed to be stored in any storage unit of the ROM 102, the RAM 103, and the storage unit 104 shown in FIG. 1, and executed by the CPU 101.

Figure 9:
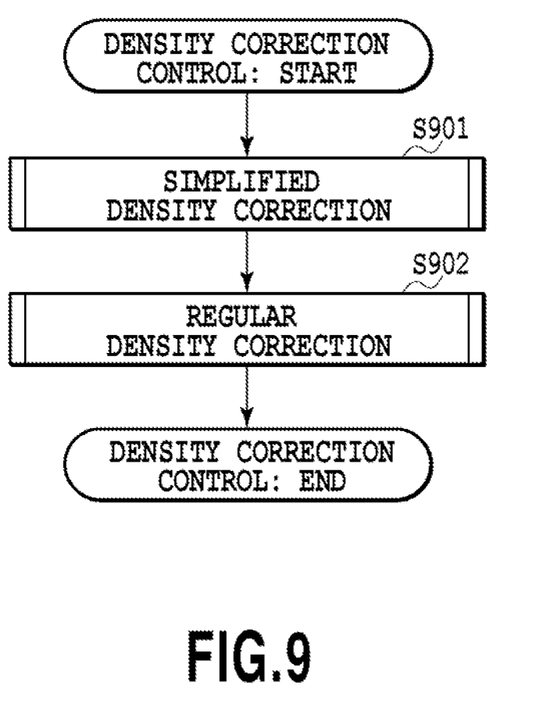
FIG. 9 is a flowchart of density correction according to the present invention.

FIG. 9 is a flowchart showing the density correction processing in the first embodiment of the present invention.

First, in S901, the CPU 101 obtains an obtainable number of density correction patches and performs simplified density correction, utilizing the time between print pages. Note that, the simplified density correction of S901 will be explained in detail with reference to a flowchart in FIG. 7.

Next, in S902, the CPU 101 obtains a necessary and sufficient number of patches every time a predetermined number of prints are reached, and performs regular density correction. Note that, the regular density correction of S902 will be explained in detail with reference to a flowchart in FIG. 8. Here, the reason why the simplified density correction of S901 and the regular density correction of S902 are separated is that the number of patches to be obtained for the density correction is generally smaller in the simplified density correction than in the regular density correction, and the original purpose of the density correction is common to either one of the above density corrections. Note that, since the first embodiment of the present invention has contents related to the simplified density correction utilizing the time between print pages and does not have contents related to the regular density correction, density correction control is not always provided with the regular density correction.

Figure 7:
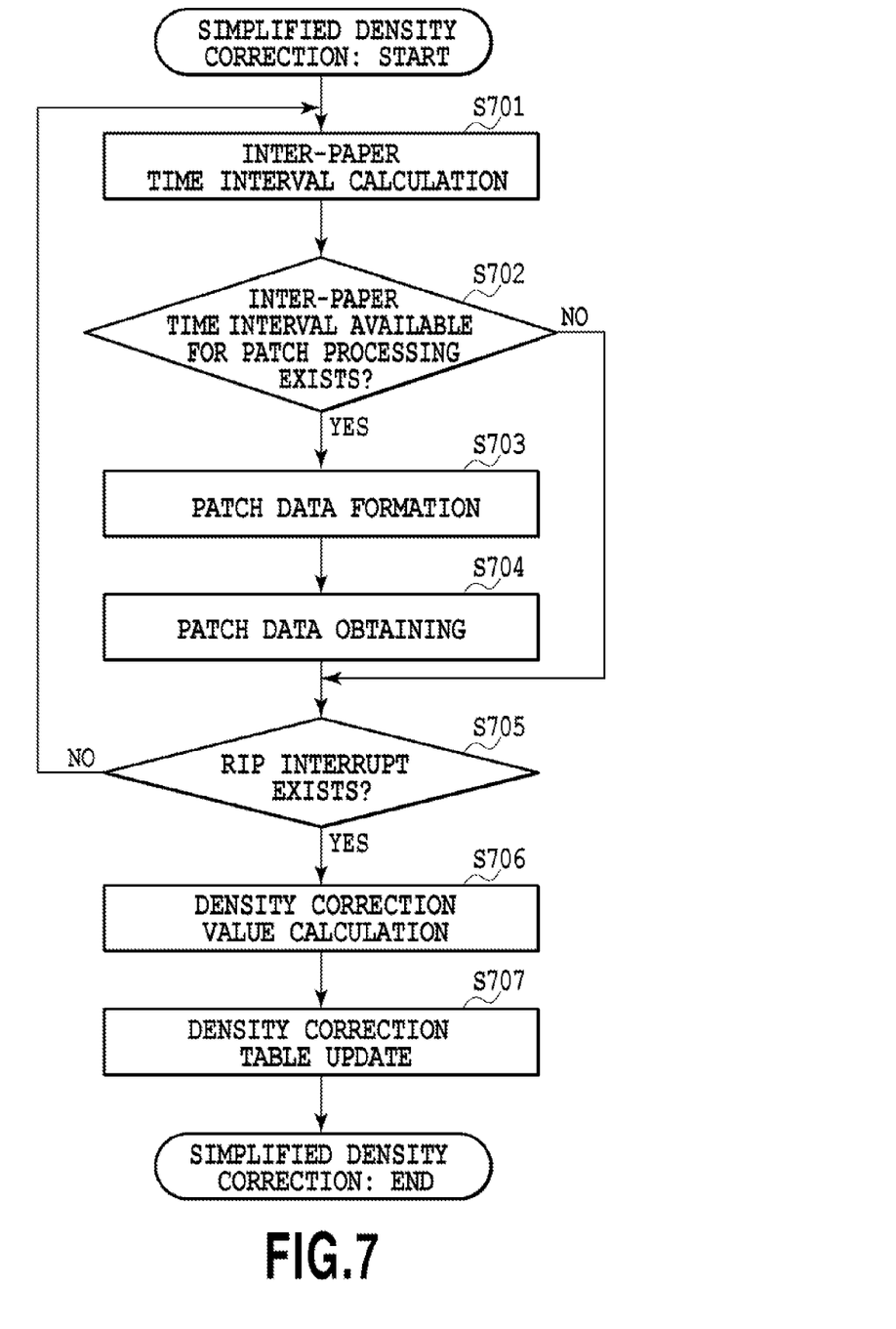
FIG. 7 is a flowchart of simplified density correction in a first embodiment of the present invention.

FIG. 7 is a flowchart explaining the simplified density correction in the first embodiment of the present invention.

First, in S701, the CPU 101 calculates a time between print pages using transmission time when the print image processing unit 109 sends data to the printer engine 200, for example, transmission time for a foregoing page or transmission time for the density correction patch.

Next, in S702, the CPU 101 determines whether or not the time between print pages calculated in S701 is longer than a predetermined time required for the processing of the density correction patch. If the time between print pages is longer than the predetermined time, the process goes to S703, and, if the time between print pages is shorter than the predetermined time, the process goes to S705.

Subsequently, in S703, the CPU 101 generates the density correction patches according to the calculated time between print pages and transmits the density correction patch to the print image processing unit 109. The density correction patches generated here are transmitted to the printer engine 200 as a laser drive signal and formed on the photosensitive drum 203 as electrostatic latent images.

Figure 11:
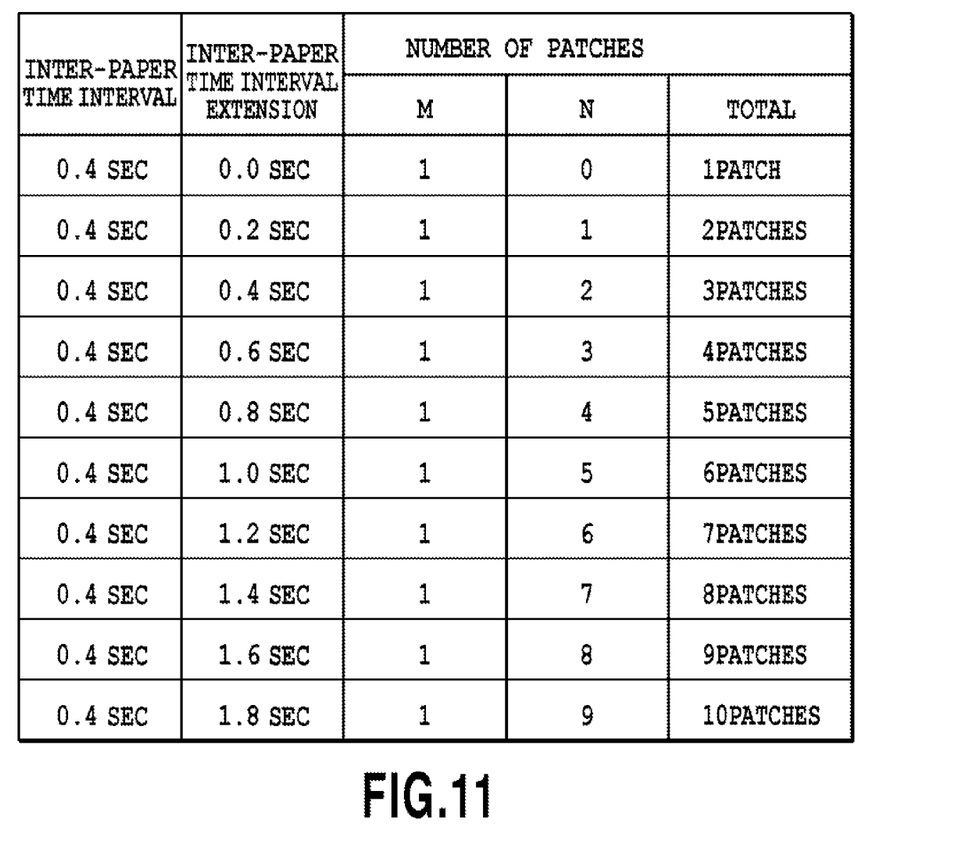
FIG. 11 is a diagram for explaining the number of density correction patches.

The number of the density correction patches to be generated here will be explained with reference to FIG. 11.

In a case where the time between print pages is extended, an original time between print pages is assumed to be 0.4 second. The number of the patches at this time is assumed to be M and the number of the patches to be added when the time between print pages is extended is assumed to be N. According to FIG. 11, the number of patches before the time between print pages is extended is one for each color. Then, when it is detected that the time between print pages is extended by 0.2 second, one patch is added for each color and two patches are formed in total for each color.

Similarly, when the time between print pages is extended by 1.0 second, five patches are added for each color and six patches are formed in total for each color. In this manner, as the time between print pages calculated in S703 becomes longer, the number of the density correction patches to be generated is increased.

Next, in S704, the CPU 101 obtains a density value which is obtained when the optical sensor 214 detects the density correction patch generated in S703. The density value obtained here is transmitted as a density signal from the printer engine 200 to the print image processing unit 109, and stored in a storage unit such as an internal register of the print image processing unit 109 and the RAM 103.

Next, in S705, the CPU 101 determines whether or not a page processing end interrupt notification is sent from the RIP processing unit 108. If the interrupt notification is sent, the process goes to S706, and, if the interrupt notification is not sent, the process goes to S701. Here, the case that the page processing end interrupt notification is not sent from the RIP processing unit 108 corresponds exactly to the case that the time between print pages is extended because of the processing speed of the interpreter processing or the rendering processing for the PDL data as explained with reference to FIG. 4 to FIG. 6B. Note that, since the page processing of the RIP processing unit 108 is performed here after the page processing of the PDL processing unit 107 has been finished, in the pipeline processing as shown in FIGS. 6A and 6B, it is sufficient to detect only the page processing end interrupt from the RIP processing unit 108.

Subsequently, in S706, the CPU 101 calculates a density correction value using the density value obtained in S704 and stores this value in a storage unit such as the RAM 103.

Lastly, in S707, the CPU 101 reflects the density correction value calculated in S706 to the density correction table within the printer image processing unit 109 to update each density value of the density correction table. This density correction table is configured with a lookup table (LUT) using a SRAM or the like. Note that, specific contents of the density correction corresponding to each of S703, S704, S706, and S707 will be explained below with reference to FIGS. 2A to 2E and FIGS. 3A to 3E.

Figure 8:
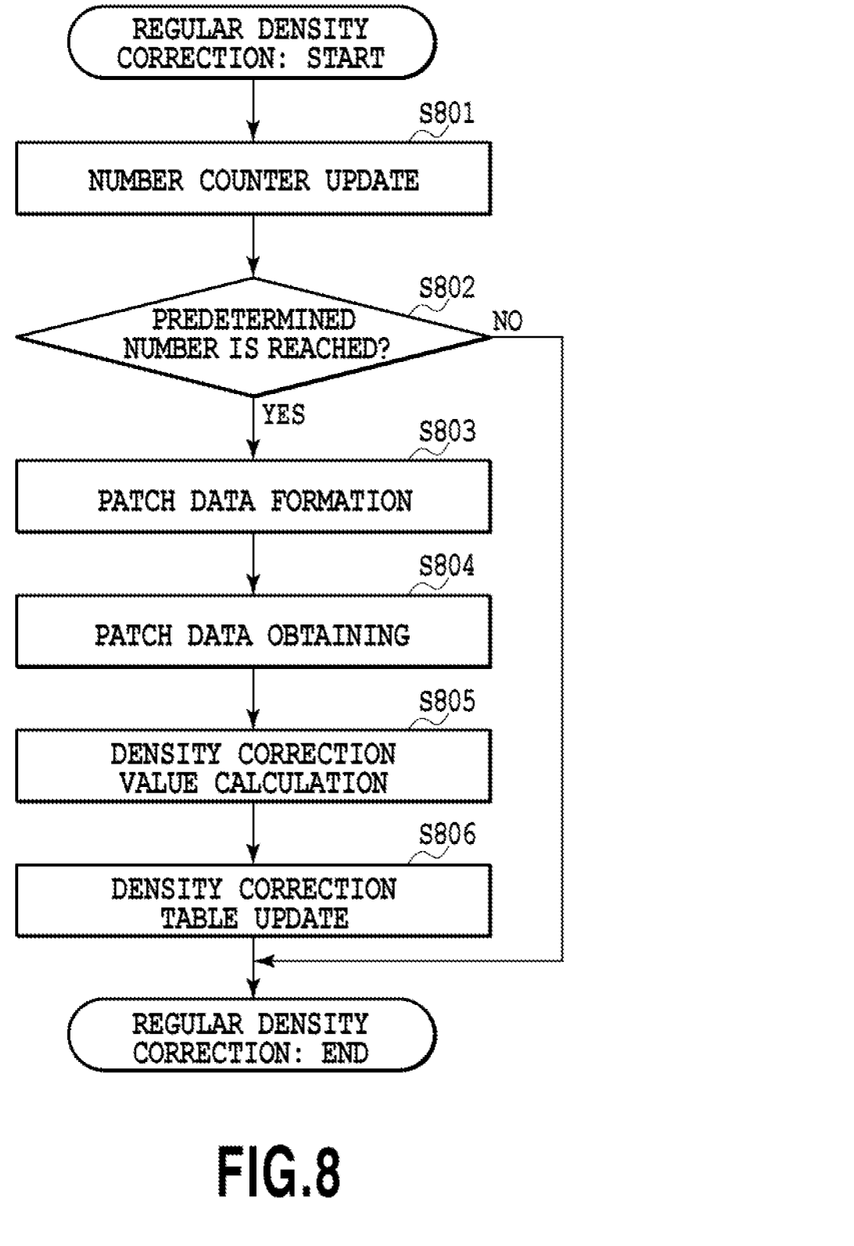
FIG. 8 is a flowchart of regular density correction in a first embodiment of the present invention.

FIG. 8 is a flowchart explaining the regular density correction in the first embodiment of the present invention.

First, in S801, the CPU 101 updates a counter value which counts the number of prints for the PDL data and is stored in a storage unit such as the internal register of the print image processing unit 109 and the RAM 103, every time the PDL data is submitted to the engine output in a page unit.

Next, in S802, the CPU 101 determines whether or not the number of prints counted in S801 reaches a predetermined number of a threshold value. If the predetermined number is reached, the process goes to S803, and, if the predetermined number is not reached, the regular density correction is not performed and the process is finished. Note that, S803, S804, S805, and S806 are the same as the steps of S703, S704, S706, and S707 which are explained in FIG. 7, respectively, and explanation will be omitted.

In this manner, in the regular density correction, the density correction is performed every time the number of pages related to printing reaches the predetermined number.

Next, with reference to FIGS. 2A to 2E and FIGS. 3A to 3E, supplementary explanation will be provided for an example of the processing for the density correction. Note that, FIGS. 2A to 2E and FIGS. 3A to 3E explain a case of performing the density correction for any one color of cyan, magenta, yellow, and black in the simplified density correction, and the density correction is assumed to have a different density correction characteristic for each of the colors. Further, FIGS. 2A to 2E and FIGS. 3A to 3E explain a case of one patch and a case of three patches, respectively.

Figure 2A:
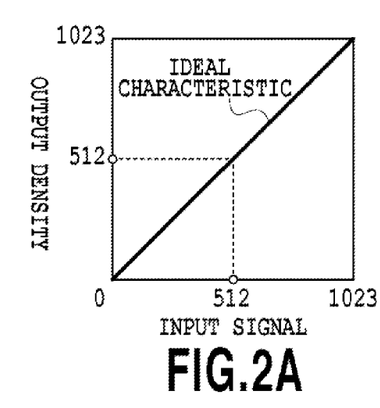
FIGS. 2A to 2E are diagrams showing characteristics in a case where density correction is performed using one patch.

FIG. 2A is a diagram showing a relationship of an output density on the photosensitive drum 203 to an input signal from the print image processing unit 109 to the printer engine 200 in a case where the relationship is assumed to be ideal. As shown in FIG. 2A, an input signal value and an output density value is required always to have the same linear relationship in gradation expression which is defined in 10 bits as 0 to 1023, for example.

Figure 2B:
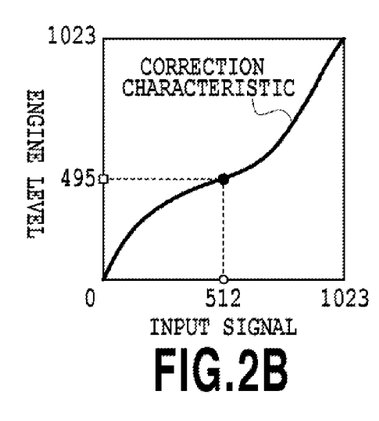
Figure 2C:
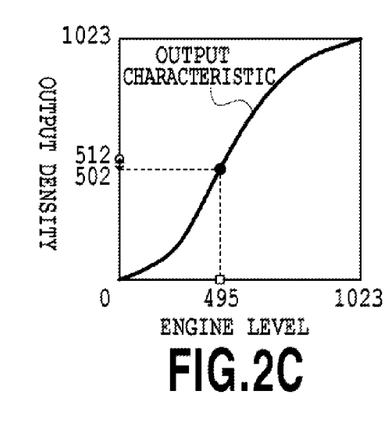
Figure 2D:
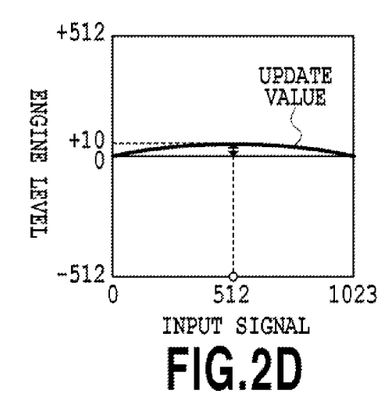

As an actual characteristic example corresponding to this ideal characteristic, a relationship of an engine level to the input signal is shown in FIG. 2B, and a relationship of the output density to the engine level is shown in FIG. 2C. As shown in FIG. 2B, the engine level, which is an output when the input signal is provided with the density correction in the density correction unit 111, has a non-linear correction characteristic. Further, as shown in FIG. 2C, the output density of an electrostatic latent image, which is formed on the photosensitive drum by the laser drive signal output at the engine level, also has a non-linear characteristic.

The density correction unit 111, which has such a correction characteristic as shown in FIG. 2B, needs to perform density correction so as to cause the output density of FIG. 2C to be always equally linear to the input signal of FIG. 2B.

Figure 2E:
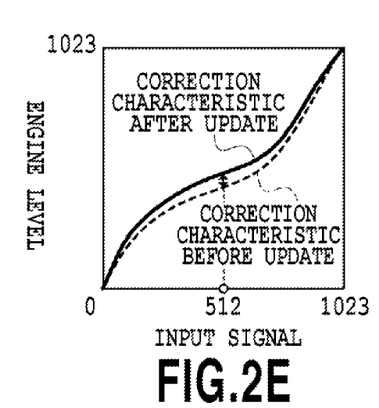
Figure 3A:
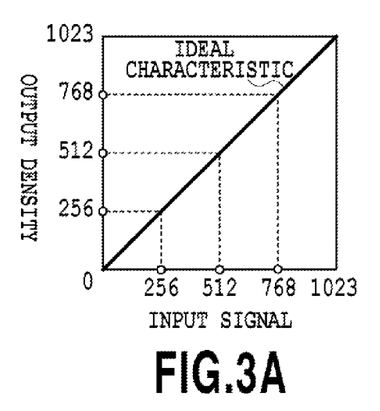
FIGS. 3A to 3E are diagrams showing characteristics in a case where density correction is performed using three patches.
Figure 3B:
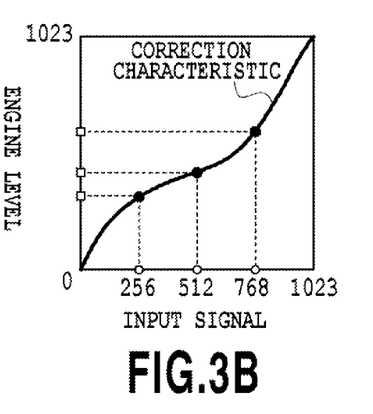
Figure 3C:
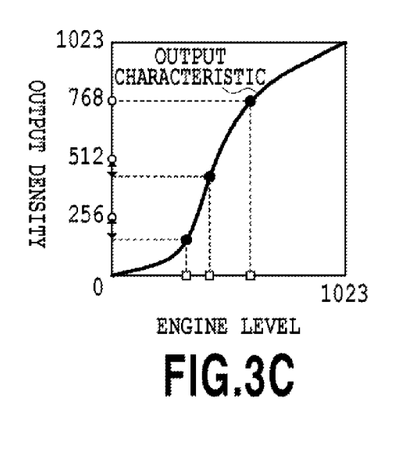
Figure 3D:
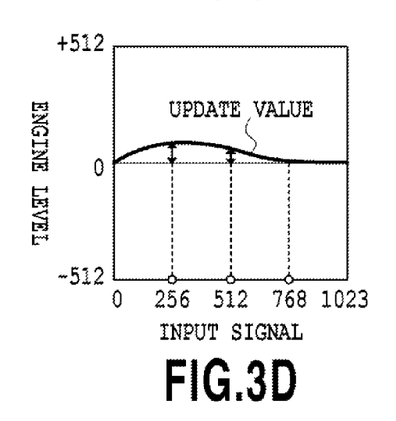
Figure 3E:
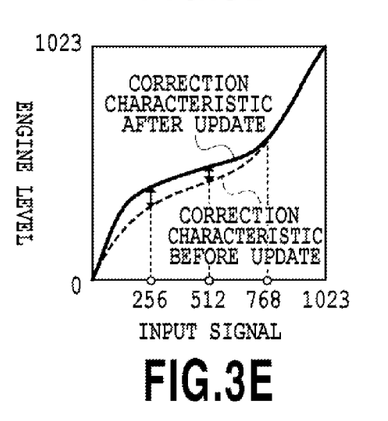

Specifically, for example, it is assumed that, the engine level corresponding to an input signal of 512, which is a value in the middle of the gradation expression of FIG. 2B, is 495, and the output density is 502 when the density of a density measurement patch corresponding to this engine level is detected by the optical sensor 214. At this time, it is found that an error of −10 is caused for an expected output density value of 512 in the ideal characteristic. Accordingly, an update value having a reverse characteristic to this error is reflected to FIG. 2B and the engine level is changed as shown in FIG. 2E.

Generally, the output characteristic of the printer engine 200 as shown in FIG. 2C changes according to used hours and use environment of the image processing apparatus 500, and therefore the density correction unit 111 corrects the output density continuously by continuing the update of the correction characteristic of FIG. 2B corresponding to FIG. 2C. However, in the example shown in FIGS. 2A to 2E, the density is obtained only for 512 which is a value in the middle of the gradation expression defined in 10 bits as 0 to 1023, and therefore all the other peripheral values are predicted and the accuracy of the density correction becomes low. Accordingly, as shown in FIGS. 3A to 3E, in a case where the time between print pages is extended because of the PDL processing or the RIP processing, the number of density measurement patches to be obtained is increased as patches for 256, 512, and 768, for example. In this manner, by improving the accuracy of the update value of FIG. 3D corresponding to FIG. 2D, it is possible to rewrite the density correction table as in FIG. 3E not as in FIG. 2E and resultantly it is possible to make the output characteristic closer to the relationship of the ideal characteristic shown in FIG. 3A.

As described above, according to the first embodiment of the present invention, in a case where the time between print pages is extended because of the PDL processing or the RIP processing, it is possible to utilize the extended time between print pages effectively for the purpose of the density correction. Accordingly, it is possible to improve the accuracy of the density correction, while suppressing the generation of the downtime caused by the density correction.

(Second Embodiment)

A second embodiment of the present invention is realized by a configuration the same as that of the first embodiment of the present invention shown in FIG. 1, and only a different point will be described below.

Figure 10:
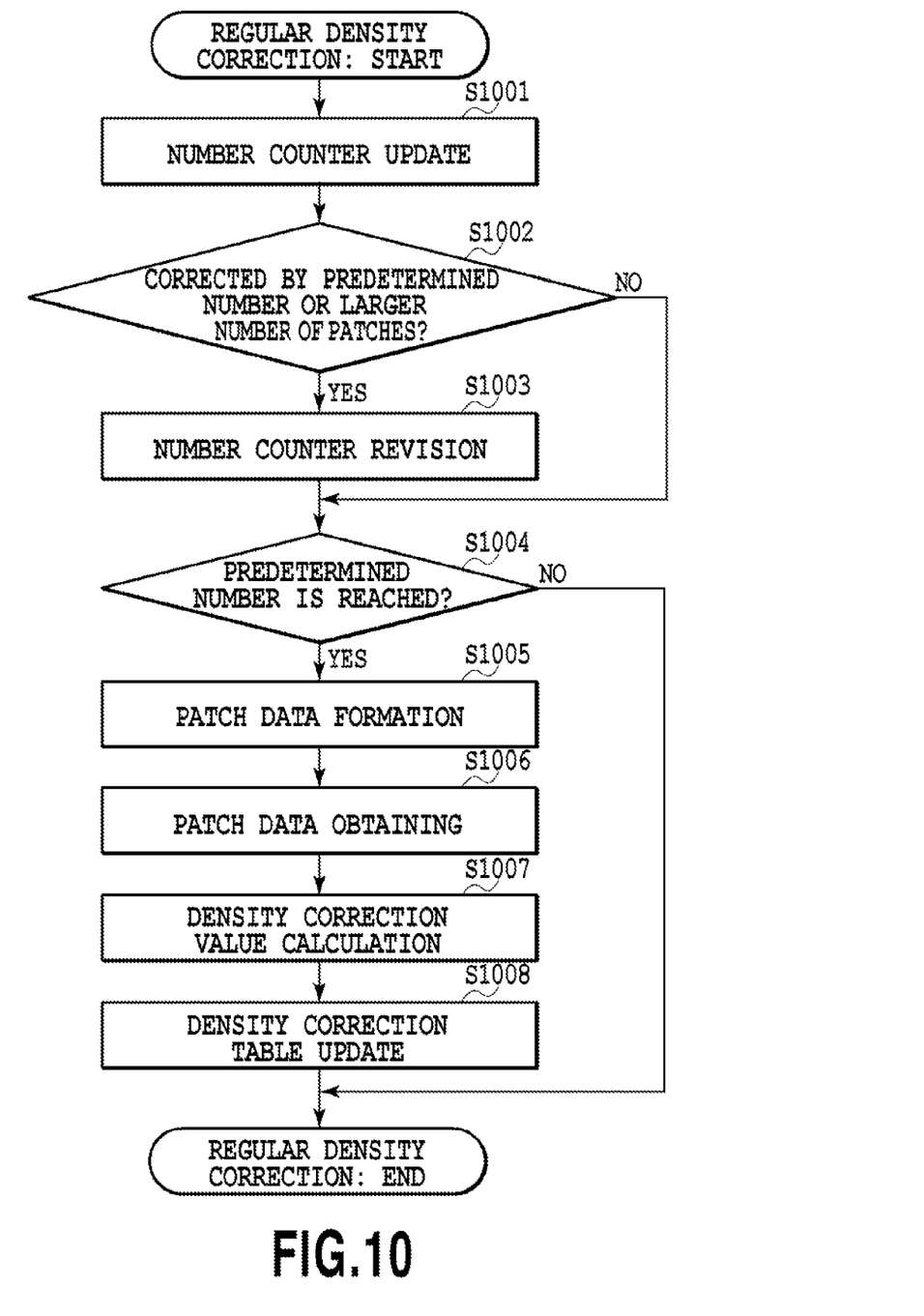
FIG. 10 is a flowchart of regular density correction in a second embodiment of the present invention.

FIG. 10 is a flowchart explaining regular density correction of the second embodiment corresponding to FIG. 8 of the first embodiment.

First, in S1001, the CPU 101 increments a counter value which counts the number prints for the PDL date and is stored in a storage unit such as the internal register of the print image processing unit 109 and the RAM 103, every time the PDL data is submitted to the engine output in a page unit. The increment of the counter value performed here means that, in a case where the initial value of the counter value is assumed to be 0, the counter value is increased one by one as increased to 1 at the engine output of the first page and increased to 2 at the engine output of the second page.

Next, in S1002, the CPU 101 determines whether or not the number of the patches output in the simplified density correction is larger than a predetermined number.

If a number equal to the predetermined number or larger is used, the process goes to S1003, and, if a number smaller than the predetermined number is used, the process goes to S1004.

Next, in S1003, the CPU 101 decrements or resets the counter value which counts the number of prints for the PDL data and is stored in a storage unit such as the internal register of the print image processing unit 109 and the RAM 103. The decrement or the reset performed here means that, in a case where the density correction is performed, for example, using five patches for each color (total 20 patches), which is not less than the predetermined number of patches, the counter value is reduced to 1 or 0 from the value of 2 at the engine output of the second page. Note that, S1004 to S1008 are the same as the steps of S802 to S806 explained in FIG. 8, respectively, and explanation will be omitted. In this manner, the counter value is decremented in S1002 and S1003, and thereby the regular density correction, which is executed every 100 prints, for example, and accompanied with the downtime, is postponed.

As described above, according to the second embodiment of the present invention, the execution of the regular density correction is postponed in a case where the simplified density correction has been performed in a high accuracy by effectively utilizing the time between print pages which is extended because of the PDL processing or the RIP processing. Thereby, it is possible to reduce the frequency of the regular density correction which generates the downtime, and to improve user convenience.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-274393, filed Dec. 15, 2011, which is hereby incorporated by reference herein in its entirety.

What is claimed is:

1. An image processing apparatus, comprising:
    an image generation unit configured to generate image data of one page;
    a printing unit configured to transfer color material to an intermediate transfer member to perform printing;
    an obtaining unit configured to obtain a time (a time between print pages) which shows a time interval between printing image data of one page and printing image data of next one page by the printing unit;
    a patch data obtaining unit configured to obtain patch data such that a number of patches corresponding to the obtained time between print pages are generated in a case where the time between print pages obtained by the obtaining unit is longer than a predetermined time; and
    a determining unit configured to determine whether or not a notification has been received, the notification indicating generation of one page of image data by the image generation unit being completed;
    wherein if it is determined by the determining unit that the notification has not been received, the obtaining unit re-obtains the time between print pages, and if the re-obtained time between print pages is longer than the predetermined time, the patch data obtaining unit re-obtains the patch data, and
    the printing unit outputs a larger number of patches to the intermediate transfer member as the time between print pages is longer, for adjusting density to be reproduced in printing by the printing unit.

2. The image processing apparatus according to claim 1, further comprising
    a counter unit configured to count the number of pages printed by the printing unit,
    wherein the printing unit outputs the patches in a case where the number of pages reaches the predetermined number.

3. The image processing apparatus according to claim 1, wherein the image generation unit includes:
    a PDL (Page Description Language) processing unit configured to interpret a page description language; and
    a RIP (Raster Image Processor) processing unit configured to generate the image data using a result of the interpretation by the PDL processing unit.

4. A method for an image processing apparatus which includes an image generation unit configured to generate image data of one page and a printing unit configured to transfer color material to an intermediate transfer member to perform printing, the method comprising the steps of:

obtaining a time (a time between print pages) which shows a time interval between printing image data of one page and printing image data of next one page by the printing unit;

obtaining patch data such that a number of patches corresponding to the obtained time between print pages are generated in a case where the time between print pages obtained by the obtaining step is longer than a predetermined time; and determining whether or not a notification has been received, the notification indicating generation of one page of image data by the image generation unit being completed, wherein if it is determined by the determining step that the notification has not been received, the time obtaining step re-obtaining the time between print pages, and if the re-obtained time between print pages is longer than a predetermined time, the patch data obtaining step re-obtaining the patch data, and outputting a larger number of patches to the intermediate transfer member by the printing unit as the time between print pages is longer, for adjusting density to be reproduced in printing by the printing unit.

5. The method according to claim 4, further comprising the steps of:

counting the number of pages printed by the printing unit; and outputting the patches by the printing unit in a case where the number of pages reaches the predetermined number.

6. The method according to claim 4, wherein the image generation unit includes:

a PDL (Page Description Language) processing unit configured to interpret a page description language; and a RIP (Raster Image Processor) processing unit configured to generate the image data using a result of the interpretation by the PDL processing unit.

7. A non-transitory computer-readable storage medium storing computer-executable code of a program for causing a computer to execute the method according to claim 4.

* * * * *